US010454992B2

(12) United States Patent
Holmgren et al.

(10) Patent No.: US 10,454,992 B2
(45) Date of Patent: Oct. 22, 2019

(54) AUTOMATED RSS FEED CURATOR

(71) Applicant: International Business Machines Corporation, Armonk, NY (US)

(72) Inventors: Joshua J. Holmgren, Denver, CO (US); Pawan K. Lakshmanan, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 15/098,552

(22) Filed: Apr. 14, 2016

(65) Prior Publication Data
US 2017/0300577 A1    Oct. 19, 2017

(51) Int. Cl.
*H04L 29/08*   (2006.01)
*G06F 17/30*   (2006.01)
*G06F 16/951*  (2019.01)

(52) U.S. Cl.
CPC ............ *H04L 67/02* (2013.01); *G06F 16/951* (2019.01); *H04L 67/26* (2013.01)

(58) Field of Classification Search
CPC ........... G06F 17/30867; G06F 17/3053; G06F 16/951; H04L 67/02; H04L 67/26
See application file for complete search history.

(56) References Cited

U.S. PATENT DOCUMENTS

| | | | |
|---|---|---|---|
| 7,584,194 B2 | 9/2009 | Tuttle et al. | |
| 7,702,675 B1 * | 4/2010 | Khosla | G06F 17/30884 707/710 |
| 7,720,835 B2 * | 5/2010 | Ward | G06Q 50/01 707/710 |
| 7,930,290 B2 * | 4/2011 | Farouki | G06F 17/30864 707/710 |
| 7,958,125 B2 * | 6/2011 | Yan | G06F 17/30705 707/737 |
| 8,200,775 B2 * | 6/2012 | Moore | G06F 17/3089 709/217 |
| 8,290,926 B2 * | 10/2012 | Ozzie | G06F 17/3089 707/708 |
| 8,650,485 B2 * | 2/2014 | Tsai | G06F 17/30867 715/234 |
| 8,782,124 B2 * | 7/2014 | Clark | G06F 17/30876 709/203 |
| 9,026,641 B2 * | 5/2015 | Emanuel | G06F 17/3089 709/223 |
| 9,104,773 B2 * | 8/2015 | Gandhi | G06F 17/3089 |

(Continued)

OTHER PUBLICATIONS

Hurtado, "Automated System for Improving RSS Feeds Data Quality," Edingburgh Napier University, Computer Science Department, Apr. 2015, 10 pages.

*Primary Examiner* — Miranda Le
(74) *Attorney, Agent, or Firm* — VanLeeuwen & VanLeeuwen; William J. Stock

(57) ABSTRACT

An approach is provided in which an information handling system crawls a first document corresponding to an existing curated RSS feed list and discovers a new RSS feed embedded in the first document. The information handling system analyzes a second document corresponding to the new RSS feed and generates a feed compatibility score based on the analysis. In turn, the information handling system adds the new RSS feed to the curated RSS feed list when the feed compatibility score reaches a feed compatibility threshold.

17 Claims, 6 Drawing Sheets

(56) References Cited

U.S. PATENT DOCUMENTS

| | | | |
|---|---|---|---|
| 9,268,867 B2* | 2/2016 | O'Shaughnessy | G06F 17/30884 |
| 9,342,851 B2* | 5/2016 | Musil | G06Q 50/01 |
| 9,558,185 B2* | 1/2017 | Potok | G06F 17/30011 |
| 2007/0043761 A1 | 2/2007 | Chim et al. | |
| 2007/0106650 A1* | 5/2007 | Moore | G06F 8/36 |
| 2007/0156809 A1* | 7/2007 | Dickinson | G06Q 10/06 709/203 |
| 2008/0114755 A1* | 5/2008 | Wolters | G06F 17/30873 |
| 2008/0201449 A1* | 8/2008 | Huang | H04L 67/06 709/218 |
| 2008/0281832 A1 | 11/2008 | Pulver et al. | |
| 2009/0006974 A1* | 1/2009 | Harinarayan | G06F 17/30867 715/738 |
| 2009/0193097 A1* | 7/2009 | Gassewitz | G06F 15/173 709/218 |
| 2012/0124175 A1* | 5/2012 | Yang | G06F 17/3089 709/219 |
| 2012/0179752 A1* | 7/2012 | Mosley | G06Q 10/10 709/204 |
| 2014/0040725 A1* | 2/2014 | Foster | G06F 17/2247 715/234 |
| 2014/0101304 A1* | 4/2014 | Webster | H04L 67/26 709/224 |
| 2014/0122493 A1* | 5/2014 | Sifry | G06F 17/3089 707/738 |
| 2014/0317132 A1* | 10/2014 | Renger | G06F 17/30035 707/756 |
| 2016/0321261 A1* | 11/2016 | Spasojevic | G06F 17/3053 |

* cited by examiner

Document 600

Company XYZ Facing A 'Take Under' As Company ABC Deal Rumored, Products Cut

AUTHOR: Jane Doe 2:10 PM EST January 5, 2016

Company XYZ (XYZ) could be facing a "take-under" — a buyout price lower than market value — from any of a number of private equity firms that might then dismantle the troubled Web company, an analyst said Monday.

Private equity groups might be interested in Company XYZ, Smith Securities said in a research note. Subscribe to <Smith Securities RSS Feed> for further details regarding securities news articles.
— Embedded RSS Feed 610

Company XYZ has been looking at potential buyers while it pares costs, as the company has struggled to re-spark growth.

"Company XYZ did not get any seasonal uplift from 4Q digital media advertising demand, relative to its much larger peers, which we think underscores the ongoing competitive challenges for audience and engagement growth across digital media platforms and properties," wrote Bill Smith of Smith of Smith Securities.

"We would expect large private equity investors to seek a deep discount, perhaps even a take-under relative to Company XYZ's implied market value, with an intent to split the core business apart to try to generate value from the sum of the parts vs. the current whole value of the core business," Smith said.

Company XYZ stock rose 0.7% to 35.40 in afternoon trading in the stock market today, earlier touching a three-month high of 36.10. Subscribe to <Company XYZ RSS Feed> for further details.
Embedded RSS Feed 620

FIG. 6

AUTOMATED RSS FEED CURATOR

BACKGROUND

The present disclosure relates to automatically adding high-quality RSS feeds to a curated RSS feed list based on analysis of a document corresponding to a new RSS feed discovered in a document corresponding to an existing curated RSS feed.

RSS, which stands for Rich Site Summary or Really Simple Syndication, uses a family of standard web feed formats to publish frequently updated information. RSS feeds include "posts" that correspond to blog entries, news headlines, audio, video, etc. Each RSS post typically includes text, such as a title, as well as metadata that points to a corresponding document, such as a URL. As a result, RSS feeds enable publishers to automatically syndicate information in real-time and use standard XML file formats to ensure compatibility with many different client machines/programs.

RSS feeds also benefit users who wish to receive timely updates from preferred websites or to aggregate information from many websites. When a user subscribes to a website RSS feed, the subscription removes the need for the user to manually check the website for new content. Instead, the user's browser constantly receives updates via the RSS feed and informs the user of the received updates.

As with most Internet-based information, some RSS feeds provide higher quality information and/or more relevant information compared with other RSS feeds. Depending on world events, a single RSS feed may provide ten to a hundred RSS posts to a user on a daily basis. As such, users may be fastidious to their RSS feed subscriptions. Otherwise, users may subscribe to an RSS feed and find themselves inundated with irrelevant and/or non-factual posts to peruse.

BRIEF SUMMARY

According to one embodiment of the present disclosure, an approach is provided in which an information handling system crawls a first document corresponding to an existing curated RSS feed list and discovers a new RSS feed embedded in the first document. The information handling system analyzes a second document corresponding to the new RSS feed and generates a feed compatibility score based on the analysis. When the feed compatibility score reaches a feed compatibility threshold, the information handling system adds the new RSS feed to the curated RSS feed list.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary depiction of a news article with embedded RSS feeds.

DETAILED DESCRIPTION

Figure 1:
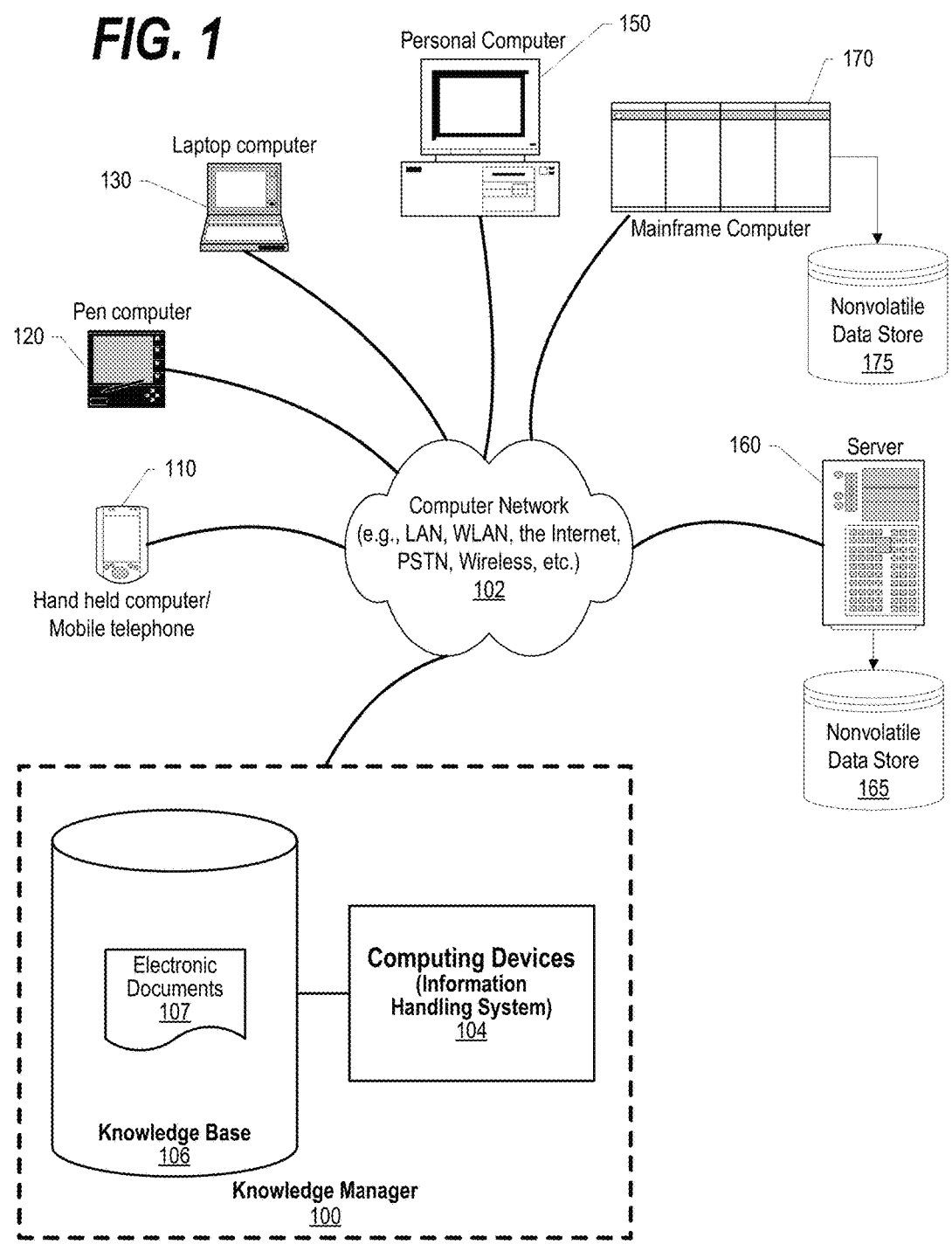
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system knowledge manager 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
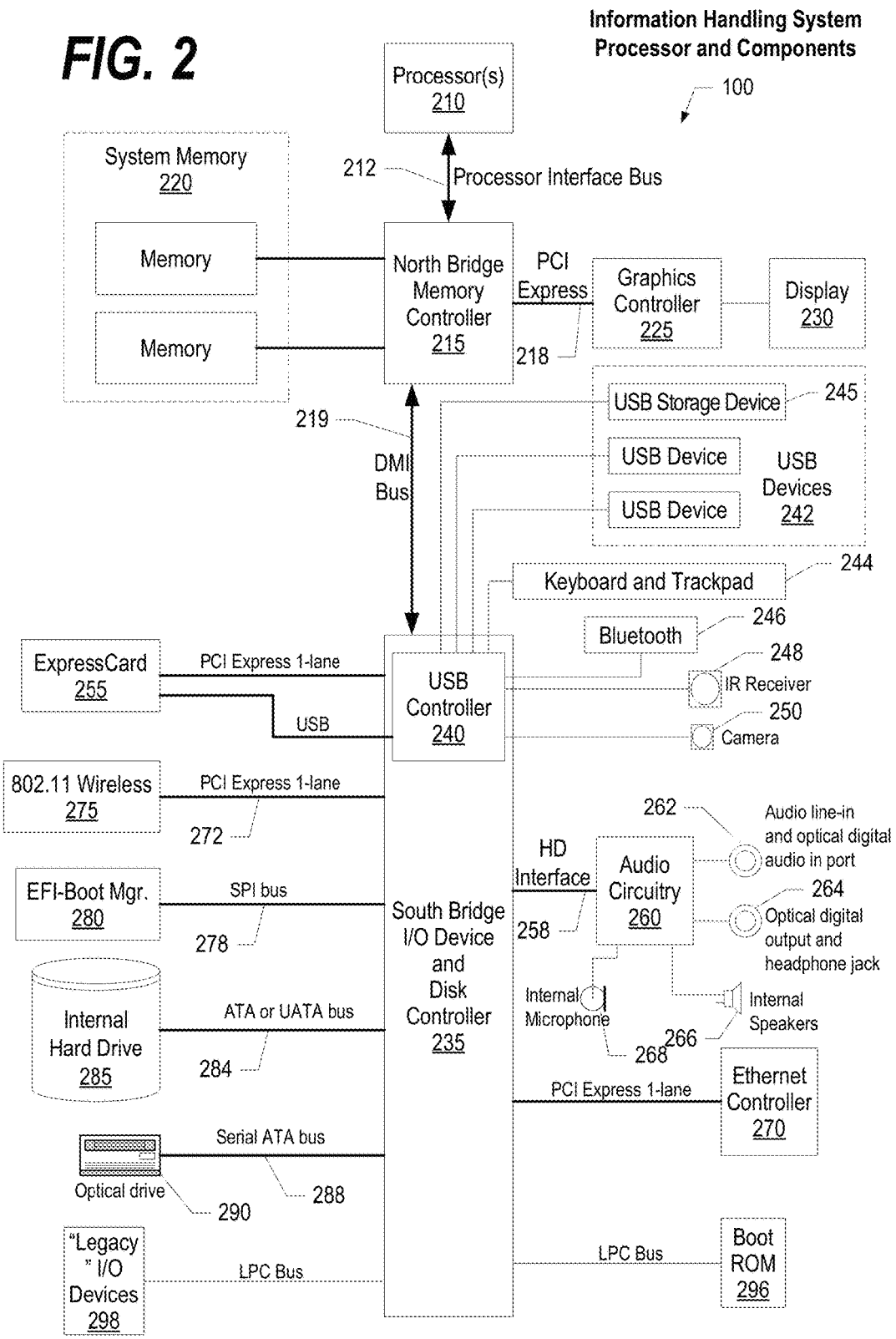
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 7 depict an approach of an information handling system that provides an automated mechanism for adding high quality RSS feeds to a curated RSS feed list. The information handling system obtains a list of user-selected, high quality RSS feeds and adds the user-selected RSS feeds to the curated feed list. The information handling system then crawls documents referenced by the user-selected RSS feeds and discovers new RSS feeds that are embedded in the documents. Next, the information handling system identifies new documents corresponding to the newly discovered RSS feeds for compatibility, such as their compatibility to user-defined parameters and compatibility with documents that were present in the user selected RSS feeds. In turn, the information handling system adds the newly discovered RSS feeds to the curated RSS feed list when the analysis results in a feed compatibility score that reaches a feed compatibility threshold.

Figure 3:
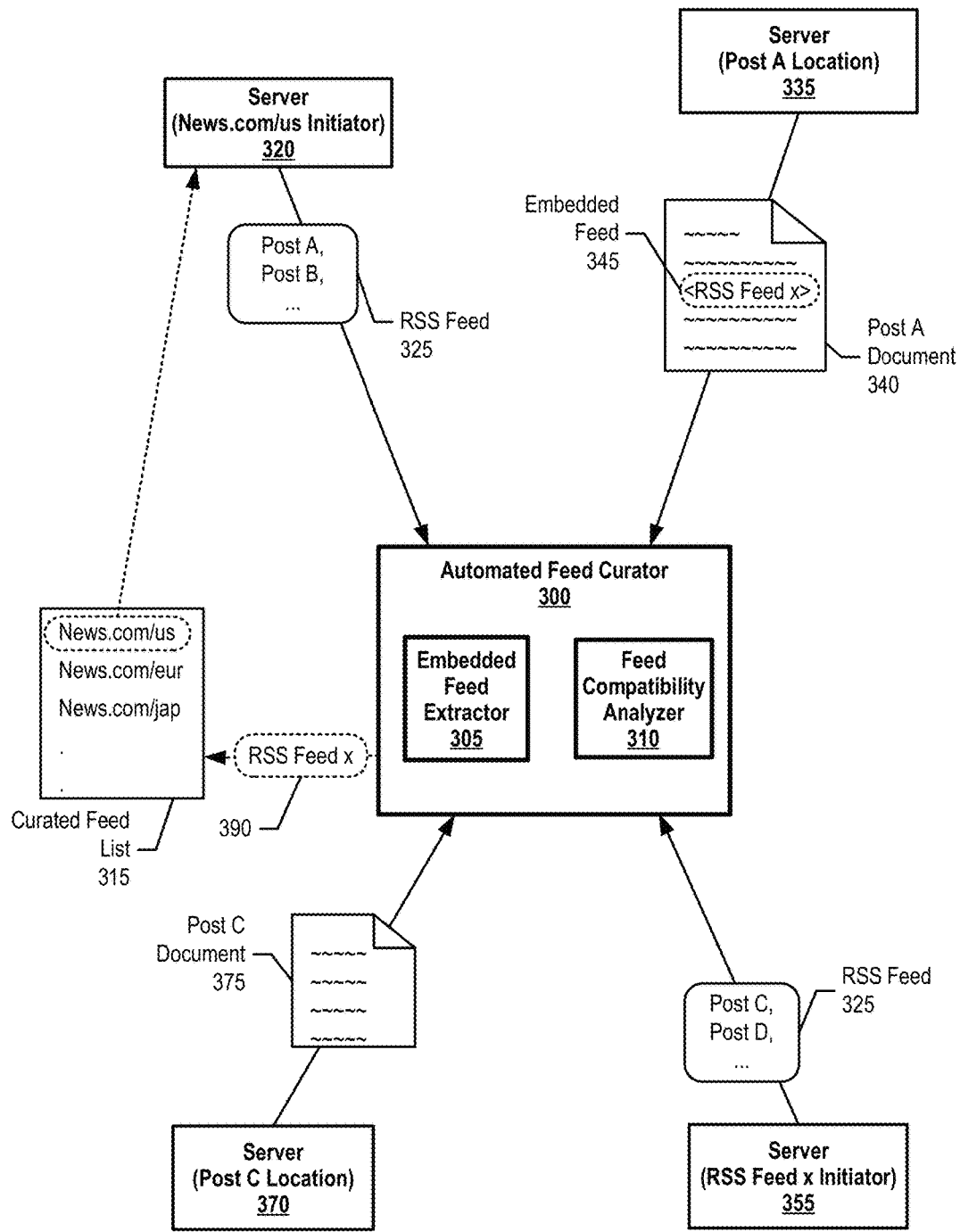
FIG. 3 depicts an automated feed curator that adds newly discovered RSS feeds to a user's curated feed list.

FIG. 3 depicts an automated feed curator that adds newly discovered RSS feeds to a user's curated feed list. Automated feed curator 300 maintains a list of high quality RSS feeds in curated feed list 315. In one embodiment, curated feed list 315 includes an initial list of user-selected RSS feeds. FIG. 3 shows that curated feed list 315 includes three RSS feeds, which are News.com/us, News.com/eur, and News.com.jap.

Automated feed curator 300 monitors RSS feeds according to curated feed list 315. "News.com/us" is one of the curated RSS feeds, which originate from server 320. News.com/us 320 provides RSS feed 325 to automated feed curator 300 (e.g., via a computer network), which includes Post A, Post B, etc. Each of the RSS posts, in one embodiment, may include a small amount of information (title, author, etc.) and a link to an actual document such as a news article.

The example in FIG. 3 shows that Post A is located in server 335. As such automated feed curator 300 retrieves post A document 340 from server 335 and uses feed extractor 305 to determine whether post A 340 includes any embedded RSS feeds (see FIG. 6 and corresponding text for further details). The example in FIG. 3 shows that post A 340 includes embedded feed 345 of "RSS Feed x." As such, automated feed curator 300 begins to monitor the RSS Feed x that originates from server 355. In one embodiment, automated feed curator 300 subscribes to RSS Feed x to begin monitoring RSS Feed x.

Automated feed curator 300 receives RSS Feed x 325, which includes RSS post C, post D, etc. Automated feed curator 300 selects post C, which includes a URL that points to sever 370, and retrieves post C document 375 from server 370. Feed compatibility analyzer 310 analyzes post C document to determine whether the document includes information relevant to the user's criteria and similarity to documents from previously subscribed feeds and to whether to add RSS Feed x to curated feed list 310. In one embodiment, feed compatibility analyzer 310 performs analysis steps such as those shown in FIG. 5 to generate a feed compatibility score and compare the feed compatibility score to a feed compatibility threshold.

Based on the results of feed compatibility analyzer 310, automated feed curator 300 determines that RSS Feed x is a high-quality RSS feed. As a result, automated feed curator 300 adds RSS Feed x 390 to curated feed list 315 and begins collection of RSS posts from the RSSC feed to offer to a user.

Figure 4:
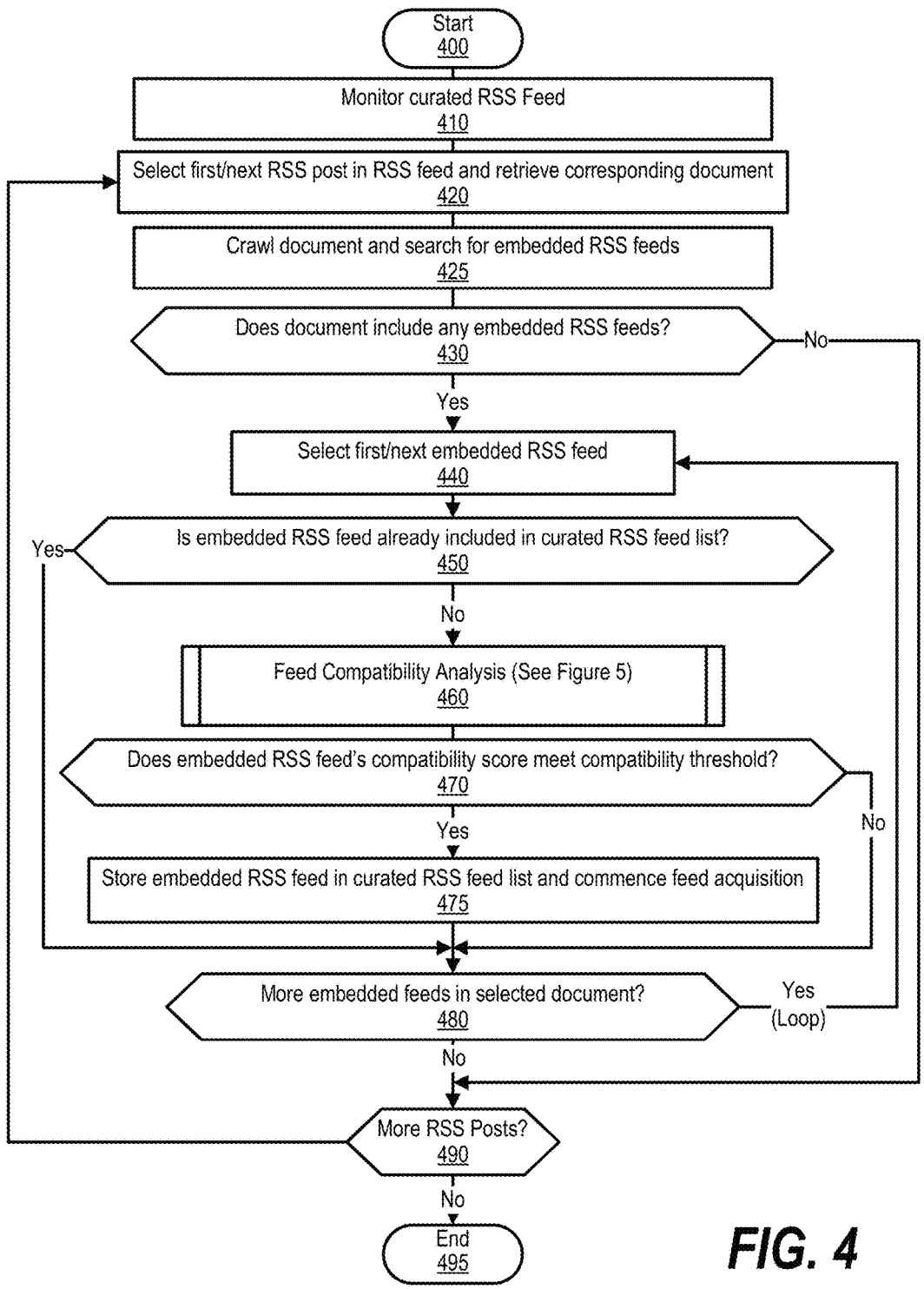
FIG. 4 is an exemplary flowchart depicting steps taken by an information handling system to discover and analyze new RSS feeds embedded in documents corresponding to existing curated RSS feeds.

FIG. 4 is an exemplary flowchart depicting steps taken by an information handling system to discover and analyze new RSS feeds embedded in documents corresponding to existing curated RSS feeds. FIG. 4 processing commences at 400 whereupon, at step 410, the process monitors a curated RSS feed, such as a user-selected RSS feed corresponding to a news website. At step 420, the process selects a first RSS post in the RSS feed and retrieves a corresponding document. For example, the first RSS post may in include a URL that points to a news article stored on a server that discusses a company's financial status.

At step 425, the process crawls the document and searches for embedded RSS feeds. Continuing with the example above, the news article may include an embedded RSS feed that points to a Wall Street newspaper. The process determines as to whether the document includes any embedded RSS feeds (decision 430). If the document does not include any embedded RSS feeds, then decision 430 branches to the 'no' branch, bypassing steps 440 through 480.

On the other hand, if the document includes one or more embedded RSS feeds, then decision 430 branches to the 'yes' branch. At step 440, the process selects the embedded RSS feed and determines as to whether the embedded RSS feed is already included in the curated RSS feed list to avoid duplication (decision 450). If the embedded RSS feed is already included in curated RSS feed list, then decision 450 branches to the 'yes' branch, bypassing steps 460 through 475.

On the other hand, if the embedded RSS feed is not included in the curated RSS feed list, then decision 450 branches to the 'no' branch. At predefined process 460, the process analyzes documents referenced by posts provided the embedded RSS feed to determine whether the embedded RSS feed should be added to the curated RSS feed list (see FIG. 5 and corresponding text for processing details).

Figure 5:
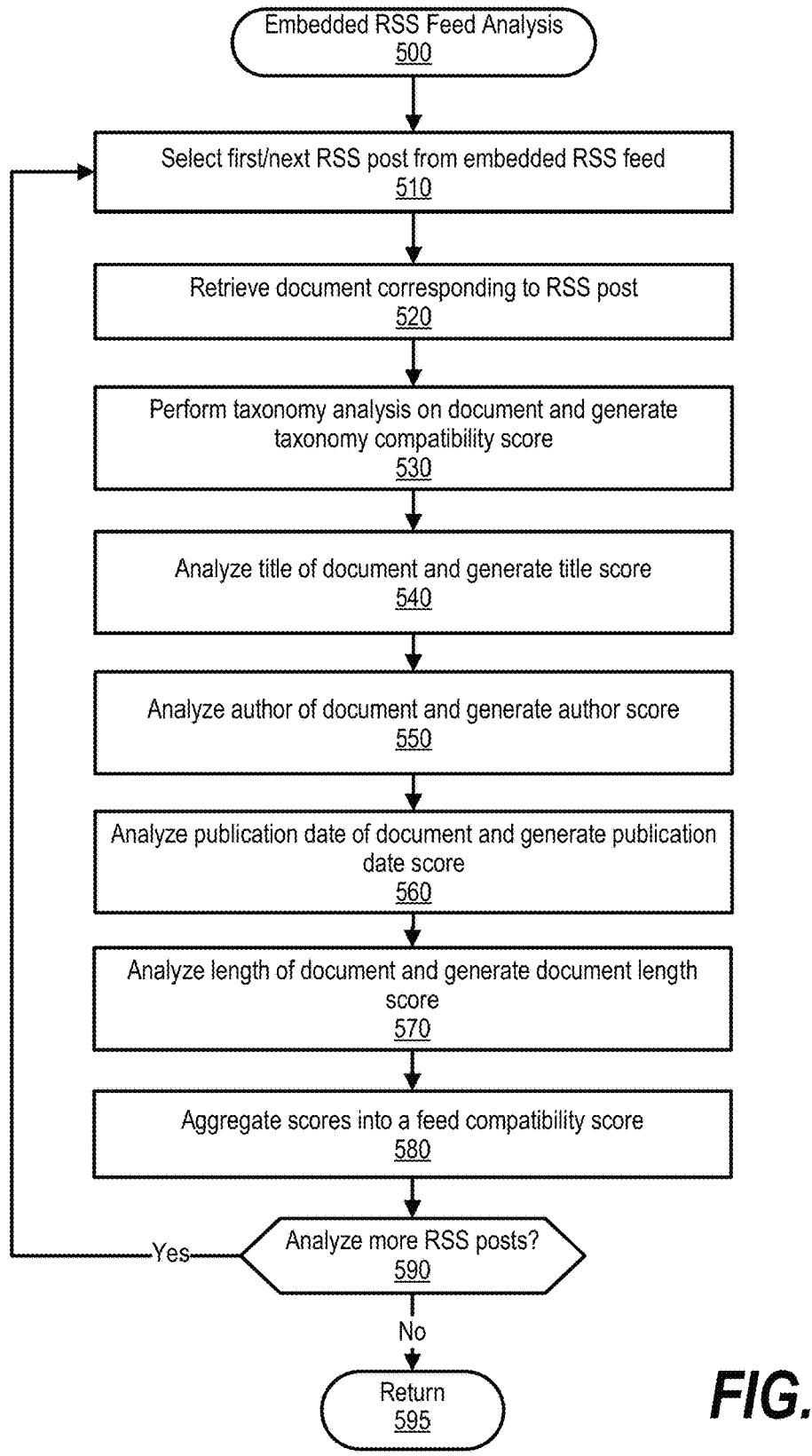
FIG. 5 is an exemplary flowchart depicting steps taken by an information handling system to generate compatibility scores of newly discovered RSS feeds embedded in documents corresponding to currently curated RSS feeds.

The process determines as to whether the embedded RSS feed's compatibility score, generated from steps shown in FIG. 5, meets a compatibility threshold (decision 470). In one embodiment, a user sets a predefined compatibility threshold, such as on a scale from 0-100. If the embedded RSS feed's compatibility score meets the compatibility threshold, then decision 470 branches to the 'yes' branch, whereupon the process adds the embedded RSS feed to the curated RSS feed list (step 475). On the other hand, if the embedded RSS feed's compatibility score does not meet the compatibility threshold, then decision 470 branches to the 'no' branch and bypasses step 475.

The process determines as to whether the document, which was retrieved in step 420, includes more embedded RSS feeds (decision 480). If the document includes more embedded RSS feeds, then decision 480 branches to the 'yes' branch which loops back to select and process the next embedded RSS feed. This looping continues until the selected document does not include any more embedded RSS feeds, at which point decision 480 branches to the 'no' branch exiting the loop.

The process determines as to whether there are more RSS posts in the RSS feed (decision 490). If there are more RSS posts, then decision 490 branches to the 'yes' branch which loops back to select and process the next RSS post. This looping continues until there are no more RSS posts in the selected RSS feed, at which point decision 490 branches to the 'no' branch exiting the loop. FIG. 4 processing thereafter ends at 495.

FIG. 5 is an exemplary flowchart depicting steps taken by an information handling system to generate compatibility scores of newly discovered RSS feeds embedded in documents corresponding to currently curated RSS feeds. FIG. 5 processing commences at 500 whereupon, at step 510, the process selects an RSS post on a recently discovered embedded RSS feed. For example, if the embedded RSS feed corresponds to a Wall Street newspaper, the RSS post may correspond to a company's acquisition.

At step 520, the process retrieves the document corresponding to the RSS post, such as retrieving a news article from a URL included in the RSS post. At step 530, the process performs taxonomy analysis on the document and generates a taxonomy score. For example, if a user has specified that that he is interested in "sports/football" articles and taxonomy for the article title matches this category with a high confidence then a positive taxonomy score is added to the overall feed score. Additionally, if the document's taxonomy is present in more than a threshold from previously subscribed feeds, such as 10% of documents, then a positive taxonomy score is added to the overall feed compatibility score.

At step 540, the process analyzes the document's title and generates a title score. For example, the document's title may be analyzed to extract keywords and concepts. If the extracted keywords and concepts are also present in more than a threshold of documents' titles from previously subscribed feeds, such as 10%, then a positive title score is added to the overall feed compatibility score.

At step 550, the process analyzes the document's author and generates an author score. For example, if the author is also present in more than a threshold of documents from previously subscribed feeds, such as 5%, then a positive author score is added to the overall feed compatibility score.

At step 560, the process analyzes the document's publication data and generates a publication date score. For example, if the document's publication date is fairly recent (e.g., the past week or month) then a positive publication date score is added to the overall feed compatibility score.

At step 570, the process analyzes the document's length and generates an article length score. For example, the user may specify a minimum and maximum word count or byte count for documents that the user wishes to see in the user's RSS feeds. If the document length falls within the specified user bounds then a positive document length score is added to the overall feed compatibility score. In another example, if the document length, measured in either word count or byte count, falls within one standard deviation of the mean length observed in documents from previously subscribed feeds, then a positive document length score is added to the overall feed compatibility score. At step 580, the process aggregates the scores into a feed compatibility score.

The process determines as to whether to analyze more RSS posts from the newly discovered RSS feed (decision 590). For example, if the first document generates a compatibility score that reaches the compatibility threshold, the process may not analyze additional RSS posts. However, if the first document generates a compatibility score that is close to the compatibility threshold, such as 75% of the compatibility threshold, then process may evaluate another RSS post's document and, for example, average the two document's feed compatibility scores together. If the process determines to analyze more RSS posts, then decision 590 branches to the 'Yes' branch to analyze another document corresponding to another RSS post. This looping continues until the process determines not to analyze additional posts, at which point decision 590 branches to the 'no' branch and FIG. 5 processing thereafter returns to the calling routine (see FIG. 4) at 595.

In one embodiment, the process may perform more, less, or different analyses than discussed above. In another embodiment, the process may analyze a pre-determined number of documents before computing a final score. For example, the process may evaluate ten articles received over the RSS feed over various times of the day to compute an overall compatibility score.

FIG. 6 is an exemplary depiction of a news article with embedded RSS feeds. The information handling system may be following an RSS feed that sends over an RSS post that points to document 600 via a URL link. The information handling system retrieves document 600 using the URL link and analyzes the document according to the steps shown in FIGS. 4 and 5. The information handling system crawls document 600 and discovers embedded RSS feeds 610 and 620.

Accordingly, the information handling system begins to analyze RSS posts and their corresponding documents coming over embedded RSS feeds 610 and 620 to determine whether either or both of the newly discovered RSS feeds should be added to the curated feed list. If the analysis determines that embedded RSS feed 610 and/or 620 are quality RSS feeds, the information handling system adds embedded RSS feed 610 and/or 620 to the curated RSS feed list and, in turn, offers RSS posts from the newly added RSS feeds to a user.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
adding a plurality of user-selected RSS feeds to a curated RSS feed list;
retrieving a first document corresponding to a first RSS (Really Simple Syndication) feed in response to monitoring the first RSS feed, wherein the first RSS feed is included in the curated RSS feed list;
identifying a link to a second RSS feed embedded in the first document, wherein the link includes a first URL (Uniform Resource Locator) and the second RSS feed is not included in the curated RSS feed list;
subscribing to the second RSS feed and capturing a first post that is transmitted over the second RSS feed, wherein the first post comprises a link to a second document that is different from the first document;
retrieving the second document utilizing the first URL;
computing a feed compatibility score of the second RSS feed in response to analyzing the second document against the first document, wherein the feed compatibility score indicates a similarity of the second document to the first document; and
adding the second RSS feed to the curated RSS feed list based on the feed compatibility score reaching a feed compatibility threshold.

2. The method of claim 1 wherein the analyzing further comprises:
performing a taxonomy analysis on the second document, resulting in a taxonomy compatibility score;
analyzing a title of the second document, resulting in a title compatibility score; and
utilizing the taxonomy compatibility score and the title compatibility score to compute the feed compatibility score.

3. The method of claim 1 further comprising:
preventing the adding of the second RSS feed to the curated RSS feed list in response to determining that the second RSS feed is already included in the curated RSS feed list.

4. The method of claim 1 further comprising:
extracting a second post from the second RSS feed, wherein the second post includes a second URL;
retrieving a third document corresponding to the second URL;
analyzing the third document and generating a different feed compatibility score; and
utilizing the feed compatibility score and the different feed compatibility score to determine whether to add the second RSS feed to the curated RSS feed list.

5. The method of claim 1 wherein, subsequent to the addition of the second RSS feed to the curated RSS feed list, the method further comprises:
displaying one or more posts included in the second RSS feed to a user.

6. The method of claim 1 further comprising:
preventing the adding of the second RSS feed to the curated RSS feed list in response to determining that the feed compatibility score does not reach the feed compatibility threshold.

7. An information handling system comprising:
one or more processors;
a memory coupled to at least one of the processors; and
a set of computer program instructions stored in the memory and executed by at least one of the processors in order to perform actions of:
adding a plurality of user-selected RSS feeds to a curated RSS feed list;
retrieving a first document corresponding to a first RSS (Really Simple Syndication) feed in response to monitoring the first RSS feed, wherein the first RSS feed is included in the curated RSS feed list;
identifying a link to a second RSS feed embedded in the first document, wherein the link includes a first URL (Uniform Resource Locator) and the second RSS feed is not included in the curated RSS feed list;
subscribing to the second RSS feed and capturing a first post that is transmitted over the second RSS feed, wherein the first post comprises a link to a second document that is different from the first document;
retrieving the second document utilizing the first URL;
computing a feed compatibility score of the second RSS feed in response to analyzing the second document against the first document, wherein the feed compatibility score indicates a similarity of the second document to the first document; and
adding the second RSS feed to the curated RSS feed list based on the feed compatibility score reaching a feed compatibility threshold.

8. The information handling system of claim 7 wherein at least one of the one or more processors perform additional actions comprising:
performing a taxonomy analysis on the second document, resulting in a taxonomy compatibility score;
analyzing a title of the second document, resulting in a title compatibility score; and
utilizing the taxonomy compatibility score and the title compatibility score to compute the feed compatibility score.

9. The information handling system of claim 7 wherein at least one of the one or more processors perform additional actions comprising:
preventing the adding of the second RSS feed to the curated RSS feed list in response to determining that the second RSS feed is already included in the curated RSS feed list.

10. The information handling system of claim 7 wherein at least one of the one or more processors perform additional actions comprising:
extracting a second post from the second RSS feed, wherein the second post includes a second URL;
retrieving a third document corresponding to the second URL;
analyzing the third document and generating a different feed compatibility score; and
utilizing the feed compatibility score and the different feed compatibility score to determine whether to add the second RSS feed to the curated RSS feed list.

11. The information handling system of claim 7 wherein, subsequent to the addition of the second RSS feed to the curated RSS feed list, at least one of the one or more processors perform additional actions comprising:
displaying one or more posts included in the second RSS feed to a user.

12. The information handling system of claim 7 wherein at least one of the one or more processors perform additional actions comprising:
preventing the adding of the second RSS feed to the curated RSS feed list in response to determining that the feed compatibility score does not reach the feed compatibility threshold.

13. A computer program product stored in a computer readable storage medium, comprising computer program code that, when executed by an information handling system, causes the information handling system to perform actions comprising:
adding a plurality of user-selected RSS feeds to a curated RSS feed list;
retrieving a first document corresponding to a first RSS (Really Simple Syndication) feed in response to monitoring the first RSS feed, wherein the first RSS feed is included in the curated RSS feed list;
identifying a link to a second RSS feed embedded in the first document, wherein the link includes a first URL (Uniform Resource Locator) and the second RSS feed is not included in the curated RSS feed list;
subscribing to the second RSS feed and capturing a first post that is transmitted over the second RSS feed, wherein the first post comprises a link to a second document that is different from the first document;
retrieving the second document utilizing the first URL;
computing a feed compatibility score of the second RSS feed in response to analyzing the second document against the first document, wherein the feed compatibility score indicates a similarity of the second document to the first document; and
adding the second RSS feed to the curated RSS feed list based on the feed compatibility score reaching a feed compatibility threshold.

14. The computer program product of claim 13 wherein the information handling system performs additional actions comprising:
performing a taxonomy analysis on the second document, resulting in a taxonomy compatibility score;
analyzing a title of the second document, resulting in a title compatibility score; and
utilizing the taxonomy compatibility score and the title compatibility score to compute the feed compatibility score.

15. The computer program product of claim 13 wherein the information handling system performs additional actions comprising:
preventing the adding of the second RSS feed to the curated RSS feed list in response to determining that the second RSS feed is already included in the curated RSS feed list.

16. The computer program product of claim 13 wherein the information handling system performs additional actions comprising:
extracting a second post from the second RSS feed, wherein the second post includes a second URL;
retrieving a third document corresponding to the second URL;
analyzing the third document and generating a different feed compatibility score; and
utilizing the feed compatibility score and the different feed compatibility score to determine whether to add the second RSS feed to the curated RSS feed list.

17. The computer program product of claim 13 wherein, subsequent to the addition of the second RSS feed to the curated RSS feed list, the information handling system performs additional actions comprising:

displaying one or more posts included in the second RSS feed to a user.

\* \* \* \* \*